US010550006B2

(12) United States Patent
Peeters

(10) Patent No.: US 10,550,006 B2
(45) Date of Patent: Feb. 4, 2020

(54) METHOD FOR OBTAINING AN IRON-COMPRISING SOLUTION OF HIGH CONCENTRATION

(71) Applicant: TESSENDERLO GROUP NV/SA, Brussels (BE)

(72) Inventor: Rudy Peeters, Tessenderlo (BE)

(73) Assignee: Tessenderlo Group NV/SA, Brussels (BE)

( * ) Notice: Subject to any disclaimer, the term of this patent is extended or adjusted under 35 U.S.C. 154(b) by 128 days.

(21) Appl. No.: 14/893,047

(22) PCT Filed: May 22, 2014

(86) PCT No.: PCT/EP2014/060589
§ 371 (c)(1),
(2) Date: Nov. 20, 2015

(87) PCT Pub. No.: WO2014/187925
PCT Pub. Date: Nov. 27, 2014

(65) Prior Publication Data
US 2016/0122200 A1 May 5, 2016

(30) Foreign Application Priority Data

May 22, 2013 (EP) .................................... 13168775
Dec. 5, 2013 (EP) .................................... 13195781

(51) Int. Cl.
*C01G 49/10* (2006.01)
*C02F 1/52* (2006.01)
(Continued)

(52) U.S. Cl.
CPC .............. *C01G 49/06* (2013.01); *B01D 53/68* (2013.01); *B01D 53/78* (2013.01); *B01F 3/00* (2013.01);
(Continued)

(58) Field of Classification Search
CPC .................................. C01G 49/10; C02F 1/52
See application file for complete search history.

(56) References Cited

U.S. PATENT DOCUMENTS 2,096,855 A * 10/1937 Thorndike ............. C01G 49/10
3,873,678 A * 3/1975 McCormick ........... C01G 49/10
423/138

(Continued)

FOREIGN PATENT DOCUMENTS

BE 1011575 A3 11/1999
DE 99972 A1 9/1973
(Continued)

OTHER PUBLICATIONS

CA 2139648 A1, Murphy et al. English Translation.*
(Continued)

*Primary Examiner* — Mark Eashoo
*Assistant Examiner* — M. Reza Asdjodi
(74) *Attorney, Agent, or Firm* — Fennemore Craig, P.C.

(57) ABSTRACT

The current invention concerns a method for increasing an iron content of a solution by converting low iron containing solutions into highly concentrated ferric chloride solutions by adding iron containing substances. The invention concerns also methods for transporting and storage of said highly concentrated ferric chloride solutions.

19 Claims, 3 Drawing Sheets

(51) Int. Cl.
 *C01G 49/06* (2006.01)
 *C01G 49/14* (2006.01)
 *B01F 3/00* (2006.01)
 *B01F 5/02* (2006.01)
 *B01F 5/10* (2006.01)
 *B01F 3/04* (2006.01)
 *C23G 1/36* (2006.01)
 *B01D 53/68* (2006.01)
 *B01D 53/78* (2006.01)
 *C23F 1/46* (2006.01)

(52) U.S. Cl.
 CPC .......... *B01F 3/0451* (2013.01); *B01F 5/0256* (2013.01); *B01F 5/106* (2013.01); *C01G 49/10* (2013.01); *C01G 49/14* (2013.01); *C02F 1/5245* (2013.01); *C23G 1/36* (2013.01); *C23F 1/46* (2013.01)

(56) References Cited

U.S. PATENT DOCUMENTS

| | | | | |
|---|---|---|---|---|
| 8,071,067 | B2* | 12/2011 | Eskilsson | C01G 49/10 423/481 |
| 8,245,565 | B2* | 8/2012 | Geyer | G01N 11/06 73/54.04 |
| 2004/0113783 | A1* | 6/2004 | Yagesh | G06Q 10/08 340/568.1 |
| 2005/0258111 | A1* | 11/2005 | Brandl | C02F 1/002 210/767 |
| 2006/0201861 | A1* | 9/2006 | Young | B01D 21/003 210/176 |
| 2011/0158869 | A1* | 6/2011 | Takahashi | C01B 7/0706 423/140 |
| 2012/0214248 | A1* | 8/2012 | Sampson | C01B 11/022 436/124 |
| 2013/0236379 | A1* | 9/2013 | Eskilsson | C01G 49/10 423/138 |
| 2016/0122200 | A1* | 5/2016 | Peeters | C01G 49/06 252/175 |

FOREIGN PATENT DOCUMENTS

| | | |
|---|---|---|
| EP | 0723935 A1 | 7/1996 |
| WO | 9426667 A1 | 11/1994 |
| WO | 2012/075109 A2 | 6/2012 |

OTHER PUBLICATIONS

International Search Report for International Application No. PCT/EP20141060589, European Patent Office, dated Nov. 28, 2014.

International Preliminary Report on Patentability for International Application No. PCT/EP2014/060589, European Patent Office, dated Aug. 31, 2015.

Written Opinion of the International Search Authority for International Application No. PCT/EP2014/060589, European Patent Office, dated Nov. 28, 2014.

Examination Report No. 1 dated May 1, 2017 in Australian patent application No. 2014270411.

Examination Report No. 2 dated Jan. 10, 2018 in Australian patent application No. 2014270411.

Office Action (Communication Pursuant to Article 94(3)) dated Aug. 18, 2017 in European patent application No. 14726140.8.

Campano, B.R., "The Kleingarn Regenerated Spent Acid at Increasing Ferrous and Ferric Chloride Content", Dec. 2012 (downloaded Jan. 4 2018 from https://wwww.finishing.com/library/compano/kleingarn.pdf).

Examination Report No. 3 dated Apr. 30, 2018 in Australian patent application No. 2014270411.

Office Action (Communication Pursuant to Article 94(3)) dated Aug. 2, 2018 in European patent application No. 14726140.8.

* cited by examiner

METHOD FOR OBTAINING AN IRON-COMPRISING SOLUTION OF HIGH CONCENTRATION

CROSS-REFERENCE TO RELATED APPLICATIONS

This application is a U.S. National Stage of PCT Application No. PCT/EP2014/060589 filed on May 22, 2014, which claims priority to European Patent Application No. EP13168775.8 filed on May 22, 2013 and to European Patent Application No. EP13195781.3 filed on Dec. 5, 2013, the entire contents of each of which are incorporated herein by reference.

TECHNICAL FIELD

The invention pertains to the technical field of obtaining a solution comprising a high iron content. More in particular, the present invention concerns a method for obtaining such a solution, preferably comprising ferrous and/or ferric chloride, in an energy-efficient manner as it does not require substantial additional heating or other types of energy input.

BACKGROUND

Solutions comprising iron can be found in many industrial applications. For instance, steel pickling facilities use acid, e.g. hydrochloric acid or sulphuric acid, to treat surfaces of steel objects, mostly steel plates. The acid is provided in aqueous solution and the waste resulting from the pickling is called waste pickling liquid or waste pickle liquor (WPL), which typically is an aqueous solution comprising iron, mainly ferrous iron, e.g. in the form of a ferrous chloride or ferrous sulphate solution. The iron content in WPL is typically less than 10 wt %, usually between 6 and 9 wt % of iron, mainly in the form of ferrous chloride ($FeCl_2$). Iron-comprising solutions are further used in water treatment, in particular ferric chloride solutions which can be used as a coagulating and/or flocculating agent. The iron content of such ferric chloride solutions is typically of the order of 15 wt %. However, higher iron content solutions can be preferred, in particular for transporting the ferric chloride solution to a water purification facility or to an intermediate distribution point to reduce transport costs or to store the solution in a storage tank. The iron content of the solution can then be reduced to the desired concentration in situ or at the distribution point by dilution or the solution of high ferric chloride concentration can be used as such for e.g. water purification.

Document WO 2012/075109 discloses a method for making a high iron-content ferric chloride solution, comprising evaporating water from a ferric chloride solution having an iron content of 15 wt % or less to increase the iron content to 23-26 wt %. The document also discloses a process for reconstituting an aqueous ferric chloride solution having an iron content of about 23 to 26 weight percent by diluting a ferric chloride solution having an iron content of about 23 to 26 weight percent with water to a lower iron content. Document WO 2012/075109 further discloses the exemplary embodiment of either mixing solid iron containing materials with hydrochloric acid to obtain a ferric chloride solution with an iron content of about 15 wt %, or of oxidizing spent pickling liquors to obtain a ferric chloride solution with an iron content of about 15 wt %. This ferric chloride solution with an iron content of about 15 wt % can then be evaporated to further increase the iron content to about 23 to about 26 wt %.

The problem with the prior art technique is that it requires intensive heating to evaporate the water from the ferric chloride solution.

There remains a need in the art for an improved process for making a high iron-content solution, preferably comprising ferric chloride, which overcomes the problem mentioned above. There also remains a need in the art for improved methods or devices for storing, transporting and/or moving such as solution, as well as for diluting such a solution.

The invention thereto aims to provide a method for making a high iron-content solution comprising ferric chloride at an increased concentration, which is more energy efficient than the prior art method.

SUMMARY OF THE INVENTION

The present invention provides a method for obtaining a solution comprising a ferric chloride at an increased concentration, preferably a concentration of at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

In an embodiment, said method comprises the steps of:

(A1) providing a solution comprising ferric chloride comprising an initial ferric chloride concentration, preferably at a concentration of at least 12 wt %;

(A2) adding hydrochloric acid to said solution, preferably adding gaseous hydrochloric acid and/or liquid hydrochloric acid, e.g. in aqueous solution, to said solution.

(A3) increasing an iron content of said solution by adding a substance comprising ferric iron, preferably hematite, ferrite, or any combination thereof, leading to a solution comprising an increased ferric chloride concentration compared to said initial ferric chloride concentration, preferably of at least 15 wt %, more preferably at least 38 wt %.

In a preferred embodiment, steps (A2) and (A3) are performed multiple times subsequently or simultaneously leading to a solution comprising an increased ferric chloride concentration compared to said initial ferric chloride concentration, preferably of at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

In a preferred embodiment, step (A2) is performed before, during and/or after step (A3).

In an alternative embodiment, said method comprises the steps of:

(B1) providing a solution comprising ferric and, optionally, ferrous chloride, comprising an initial ferric chloride concentration, preferably comprising an iron content of at least 6 wt %;

(B2) increasing an iron content of said solution by adding a substance comprising iron, ferric and/or ferrous iron, preferably iron, hematite, magnetite, iron oxide, ferrite, or any combination thereof;

(B3) oxidizing said ferrous iron and/or said ferrous chloride in said solution, preferably by oxychlorination, by oxidation, e.g. with an oxidans, and/or by chlorination, leading to a solution comprising an increased ferric chloride concentration compared to said initial ferric chloride concentration, preferably of at least 15 wt %, more preferably at least 38 wt %.

Note that in step (B1), the iron content refers to the iron content of the solution, which includes both the ferric iron content and the ferrous iron content, in particular the content of ferric and/or ferrous iron bound in the ferric and/or ferrous chloride.

In a preferred embodiment, steps (B2) and (B3) are performed multiple times subsequently or simultaneously leading to a solution comprising an increased ferric chloride concentration compared to said initial ferric chloride concentration, preferably of at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

In a preferred embodiment, step (B2) is performed before and/or during step (B3).

The methods disclosed here above are embodiments of a method for obtaining a solution comprising ferric chloride at an increased concentration, comprising the steps of:

(C1) providing a solution comprising ferric and, optionally, ferrous chloride, comprising an initial ferric chloride concentration, preferably said solution comprising a ferric chloride concentration of at least 12 wt % and/or an iron content of at least 6 wt %;

(C2) optionally adding hydrochloric acid to said solution, preferably adding gaseous hydrochloric acid and/or liquid hydrochloric acid, e.g. in aqueous solution, to said solution;

(C3) increasing an iron content of said solution by adding a substance comprising ferric and/or ferrous iron and/or iron or other iron containing substance, preferably iron, hematite, magnetite, iron oxide, ferrite, or any combination thereof;

(C4) optionally oxidizing ferrous ion in said solution, such as a ferrous ion in ferrous iron and/or ferrous chloride in said solution, preferably by oxychlorination, by oxidation, e.g. with an oxidans, and/or by chlorination, leading to a solution comprising an increased ferric chloride concentration compared to said initial ferric chloride concentration, preferably of at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

In a preferred embodiment, at least one of steps (C2) or (C4) is performed.

Note that the solution which is obtained by performing the methods of the present invention, comprises an increased ferric chloride concentration with respect to the solution provided in step (C1).

In an embodiment, hydrochloric acid is added in (C2). In another embodiment, no hydrochloric acid is added in (C2).

In an embodiment, said solution as obtained by step (C3) comprises ferrous ion and said ferrous ion in said solution is oxidized in step (C4). In another embodiment, no ferrous ion is present in said solution as obtained by step (C3) or said ferrous ion in said solution is not oxidized in step (C4).

The present invention allows to obtain a ferric chloride solution with an increased ferric chloride concentration without the necessity of an input of thermal energy.

The term "equivalent thermal energy" refers to the minimal thermal energy which is required to obtain a ferric chloride solution comprising an increased ferric chloride concentration from an initial ferric chloride concentration by evaporation of the solvent, i.c. water, from the solution.

In an embodiment, the method uses thermal energy which is at most 99%, preferably at most 95%, more preferably at most 90%, yet more preferably at most 80%, still more preferably at most 70%, even more preferably at most 60%, yet even more preferably at most 50%, yet still more preferably at most 40%, still even more preferably at most 30%, even more preferably at most 20%, yet more preferably at most 10%, still more preferably at most 5%, yet even more preferably at most 1% of the equivalent thermal energy.

In an embodiment, said increased ferric chloride concentration is higher than said initial ferric chloride concentration by at least 1 wt %, preferably at least 4 wt %, more preferably at least 8 wt %, even more preferably at least 12 wt %, still more preferably at least 15 wt %, yet more preferably at least 18 wt %, yet even more preferably at least 20 wt %, still even more preferably at least 25 wt %, yet still more preferably at least 30 wt %.

In an embodiment, said solution provided in steps (C1), (A1) or (B1) comprises a hydrochloric acid concentration of at most 10 wt %, preferably at most 9.9 wt %, such as 9.8 wt %, 9.7 wt %, 9.6 wt %, 9.5 wt %, 9.4 wt %, 9.3 wt %, 9.2 wt %, 9.1 wt %, 9.0 wt %, 8.9 wt %, 8.8 wt %, 8.7 wt %, 8.6 wt %, 8.5 wt %, 8.4 wt %, 8.3 wt %, 8.2 wt %, 8.1 wt %, 8.0 wt %, 7.9 wt %, 7.8 wt %, 7.7 wt %, 7.6 wt %, 7.5 wt %, 7.4 wt %, 7.3 wt %, 7.2 wt %, 7.1 wt %, 7.0 wt %, 6.9 wt %, 6.8 wt %, 6.7 wt %, 6.6 wt %, 6.5 wt %, 6.4 wt %, 6.3 wt %, 6.2 wt %, 6.1 wt %, 6.0 wt %, 5.9 wt %, 5.8 wt %, 5.7 wt %, 5.6 wt %, 5.5 wt %, 5.4 wt %, 5.3 wt %, 5.2 wt %, 5.1 wt %, 5.0 wt %, 4.9 wt %, 4.8 wt %, 4.7 wt %, 4.6 wt %, 4.5 wt %, 4.4 wt %, 4.3 wt %, 4.2 wt %, 4.1 wt %, 4.0 wt %, 3.9 wt %, 3.8 wt %, 3.7 wt %, 3.6 wt %, 3.5 wt %, 3.4 wt %, 3.3 wt %, 3.2 wt %, 3.1 wt %, 3.0 wt %, 2.9 wt %, 2.8 wt %, 2.7 wt %, 2.6 wt %, 2.5 wt %, 2.4 wt %, 2.3 wt %, 2.2 wt %, 2.1 wt %, 2.0 wt %, 1.9 wt %, 1.8 wt %, 1.7 wt %, 1.6 wt %, 1.5 wt %, 1.4 wt %, 1.3 wt %, 1.2 wt %, 1.1 wt %, 1.0 wt %, 0.9 wt %, 0.8 wt %, 0.7 wt %, 0.6 wt %, 0.5 wt %, 0.4 wt %, 0.3 wt %, 0.2 wt %, 0.1 wt %, 0.0 wt % or any value there between. A low concentration of HCl in the provided solution allows more HCl to be absorbed in e.g. step (A2) or (C2), which allows one to obtain a saturated solution of $FeCl_3$ with HCl after e.g. step (A2) or (C2).

In a preferred embodiment, said substance, which is added in steps (A3), (B2) or (C3), is a solid.

In an embodiment, an agent is used in the oxidation step, the agent preferably chosen out of the list of chlorine gas ($Cl_2$), ozone ($O_3$), oxygen gas ($O_2$), chlorine dioxide ($ClO_2$), sodium hypochlorite (NaOCl), oxychlorination gas (which preferably comprises a combination of oxygen gas ($O_2$) and gaseous hydrochloric acid (HCl)), peroxides, especially hydrogen peroxide ($H_2O_2$), perchlorate, especially sodium perchlorate ($NaClO_3$), or any combination thereof. Chlorine gas ($Cl_2$), oxygen gas ($O_2$), a mixture of oxygen gas and hydrochloric acid gas ($O_2$+HCl), or a mixture thereof is used in a preferred embodiment.

Whether or not the optional steps (C2) and (C4) are performed in the method may depend on the composition of the solution provided in step (C1) and/or the substance added in step (C3) to the solution to increase its iron content.

In an embodiment, step (C2) is performed and hydrochloric acid is added to the solution. This step is typically performed in case a source of chlorine atoms or ions is necessary to chlorinate iron in the solution or iron added during step (C3). In another embodiment, extra chlorine to chlorinate said iron is not necessary, or is provided in another step, e.g. during step (C4).

In an embodiment, step (C4) is performed and ferrous ion in the solution as obtained by step (C3) is oxidized. This step is typically performed if the solution provided step (C1) comprises ferrous chloride or ferrous iron, and/or the added substance in step (C3) comprises ferrous iron, leading to ferrous ion in the solution. In another embodiment, no ferrous ion or only a small amount of ferrous ion is present in the solution as obtained by step (C3), e.g. if the solution provided in step (C1) mainly comprises ferric chloride and little to no ferrous chloride and the added substance in step (C3) is e.g. ferric oxide. In such cases, an oxidation step (C4) to oxidize ferrous to ferric ion may not be necessary to increase or to further increase the ferric chloride concentration of the resulting solution.

In a preferred embodiment, at least one of the steps (C2) or (C4) is performed to lead to a solution comprising an increased ferric chloride concentration compared to said initial ferric chloride concentration.

In a preferred embodiment, both steps (C2) and (C4) are performed. Note that hereby the amount of hydrochloric acid added in step (C2) and the manner of oxidation or the amount of ferrous ion which is oxidized in step (C4) may still depend on the composition or source of the solution provided in step (C1) or the substance added to the solution in step (C3).

In a preferred embodiment, steps (C2), (C3) and/or (C4) are performed multiple times subsequently or simultaneously.

In a preferred embodiment, step (C2) is performed before, during and/or after step (C3). In a preferred embodiment, steps (C2) and/or (C3) are performed before and/or during step (C4).

In an embodiment, steps (C2) and (C3) are performed as follows:
  simultaneously;
  subsequently;
  multiple times simultaneously;
  multiple times subsequently;
  once or multiple times simultaneously, preferably until a pre-determined ferric chloride concentration is obtained, more preferably said predetermined concentration at least 40 wt %, and then once or multiple times subsequently; or
  once or multiple times subsequently, preferably until a pre-determined ferric chloride concentration is obtained, more preferably said predetermined concentration at least 40 wt %, and then once or multiple times simultaneously; whereby optionally step (C4) is performed once or multiple times simultaneously and/or subsequently.

In an embodiment, steps (C3) and (C4) are performed as follows:
  simultaneously;
  subsequently;
  multiple times simultaneously;
  multiple times subsequently;
  once or multiple times simultaneously, preferably until a pre-determined ferric chloride concentration is obtained, more preferably said predetermined concentration at least 40 wt %, and then once or multiple times subsequently; or
  once or multiple times subsequently, preferably until a pre-determined ferric chloride concentration is obtained, more preferably said predetermined concentration at least 40 wt %, and then once or multiple times simultaneously; whereby optionally step (C2) is performed once or multiple times simultaneously and/or subsequently.

In an embodiment, steps (C2), (C3) and (C4) are performed as follows:
  simultaneously;
  subsequently;
  multiple times simultaneously;
  multiple times subsequently;
  once or multiple times simultaneously, preferably until a pre-determined ferric chloride concentration is obtained, more preferably said predetermined concentration at least 40 wt %, and then once or multiple times subsequently; or
  once or multiple times subsequently, preferably until a pre-determined ferric chloride concentration is obtained, more preferably said predetermined concentration at least 40 wt %, and then once or multiple times simultaneously.

In a preferred embodiment, the hydrochloric acid is added by absorption from a gaseous state by said solution or by injecting gaseous hydrochloric acid in the solution, preferably by blowing gaseous hydrochloric acid at high pressure into the solution.

In a preferred embodiment, said substance comprises solid iron and/or solid hematite. By using solid hematite, the ferric chloride concentration can be increased to more than 75 wt %. By using solid iron or a mixture of solid iron and hematite, the ferric chloride concentration can be increased even higher than with hematite.

The previous embodiments of the method comprise the step of increasing an iron content of said solution by adding a substance comprising iron. This step seems necessary to allow an increase of the iron content of the solution without evaporation step and thus in a more energy efficient manner as in the prior art.

The present invention therefore also concerns a method for increasing iron content of a solution, comprising the steps of:
(D1) providing a solution comprising an initial iron content, preferably of at least 6 wt %; and
(D2) adding a substance comprising iron, leading to a solution comprising an increased iron content, preferably of at least 12 wt %.

Note that adding said substance is to result in an increase of the iron content of the solution, the iron content being a concentration of all iron dissolved in the solution. Said iron can be present in the form of atoms, ions, ferrous and/or ferric iron, bound in molecules or unbound, etc.

Said solution of increased iron content can be obtained as an intermediate solution in a method for obtaining a solution of high ferric chloride concentration as described in this document.

In a preferred embodiment, the added substance comprises solid ferric and/or ferrous iron, and preferably the methods herein described comprise the step of dissolving said iron in said solution, more preferably before, during and/or after said iron is bound in ferric and/or ferrous chloride.

In an embodiment, the iron content of the solution is increased from an iron content of less than 10 wt %, preferably between 4 wt % and 9 wt %, to an iron content of more than 15 wt %, e.g. 16, 17, 18, 19, 20, 21, 22, 23, 24, 25, 26, 27, 28, 29, 30 wt % or any value there between. Preferably the concentration is increased to more than 20 wt %, more preferably more than 21 wt %, yet more preferably more than 22 wt %, still more preferably more than 23 wt %, even more preferably more than 24 wt %. In a preferred embodiment, the concentration is increased to less than 30 wt %, more preferably less than 29 wt %, yet more preferably less than 28 wt %, still more preferably less than 27 wt %, even more preferably less than 26 wt %, yet even more preferably less than 25 wt %. Most preferably, the concentration is increased to about 24.5 wt %.

In an embodiment, said solution provided in step (C1) or in step (D1), comprises a ferric chloride concentration of at least 12 wt %, more preferably at least 15 wt %, more preferably at least 16 wt %, even more preferably at least 18 wt %, still more preferably at least 20 wt %, yet more preferably at least 23 wt %, even still more preferably at least 25 wt %, even yet more preferably at least 27 wt %, still yet more preferably at least 30 wt %, yet even more preferably at least 32 wt %, yet still more preferably at least 35 wt %, still even more preferably at least 38 wt %, even more preferably at least 40 wt %. Note that the method of the present invention hereby provides a manner of increasing the ferric chloride solution even higher than 40 wt %.

In a further aspect, the present invention provides a method for decreasing the ferric chloride concentration in a ferric chloride solution by diluting said solution. Preferably, said ferric chloride concentration is at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

In a preferred embodiment, said solution is diluted by adding water, preferably to obtain a ferric chloride concentration of between 5 wt % and 45 wt %, preferably between 30 wt % and 42 wt %, more preferably about 38 wt %, 39 wt %, 40 wt %, 41 wt % or any value there between.

In an embodiment, said diluting is performed in-line, preferably by adding water to said solution at or during delivery of said solution to a process which requires a ferric chloride solution of decreased ferric chloride concentration, or whereby said diluting is performed in a batch-wise process, preferably by adding an amount of water to a batch of said ferric chloride solution.

In an embodiment, said diluting is performed in-line, preferably on site, during unloading from a transport means such as barge or truck, into storage. In an embodiment, said diluting is performed in-line, preferably on site, during use or transport from a storage tank to a process unit which requires a ferric chloride solution, preferably at a pre-determined concentration, e.g. a water treatment unit.

In an embodiment, said diluting is performed by a dilution system installed on a transport means for transporting said ferric chloride solution at an increased concentration, e.g. said dilution system installed on a container, an intermodal container, a barge, a truck, etc.

In an embodiment, said diluting is performed batch-wise, preferably by adding an amount of ferric chloride solution to a tank, e.g. a storage tank, which comprises a pre-determined amount of water, preferably combined by a mixing in the tank to obtain a homogeneous solution.

In yet a further aspect, the present invention provides the use of a solution comprising a ferric chloride concentration for treating waste water, preferably as a coagulating and/or flocculating agent. Preferably said ferric chloride concentration is at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

The present invention further concerns a method for providing a ferric chloride solution at a first concentration to a water treatment unit, comprising the step of diluting a ferric chloride solution comprising a second concentration which is higher than said first concentration, preferably the second concentration at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %, by adding treated water from said water treatment unit to said ferric chloride solution.

DETAILED DESCRIPTION OF THE INVENTION

Figure 1:
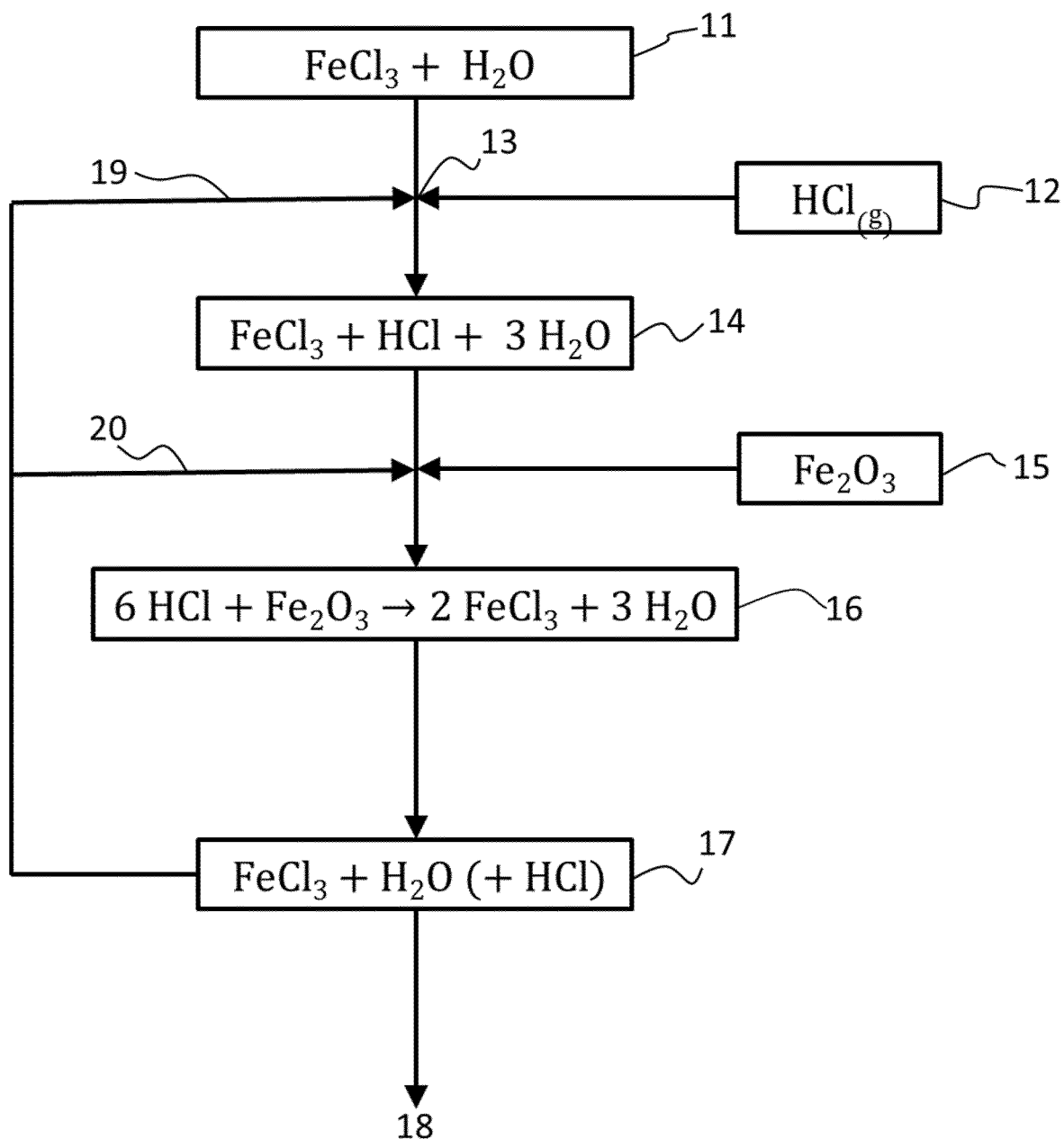
FIGS. 1-3 illustrate embodiments of methods for obtaining a ferric chloride comprising solution with increased concentration according to the present invention.

The present invention concerns a method for obtaining a solution comprising a ferric chloride at an increased concentration. The present invention also concerns a method for increasing iron content of a solution.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight" or "wt %" (weight percent), here and throughout the description unless otherwise defined, refers to the relative weight of the respective component based on the overall weight of the formulation.

The term "iron content of a solution" refers to the concentration of iron in said solution. The iron could be in the form of iron atoms, iron ions, ferric iron, ferrous iron, iron bound in molecules, etc. Note that e.g. iron-comprising solids are not part of the solution and therefore do not contribute to the solution's iron content.

In an aspect, the invention provides a method for obtaining a solution comprising a ferric chloride at an increased concentration according to claims 13 and 14, i.e. a method for increasing iron content of a solution, comprising the steps of:

(D1) providing a solution comprising an initial iron content, preferably of at least 6 wt %; and (D2) adding a substance comprising iron, leading to a solution comprising an increased iron content, preferably of at least 12 wt %.

Note that adding said substance is to result in an increase of the iron content of the solution, the iron content being a concentration of all iron dissolved in the solution. Said iron can be present in the form of atoms, ions, ferrous and/or ferric iron, bound in molecules or unbound, etc.

Said solution of increased iron content can be obtained as an intermediate solution in a method for obtaining a solution of high ferric chloride concentration as described in this document. Also, said method for increasing iron content of a solution can be used in a a method for obtaining a solution of high ferric chloride concentration as described in this document, in particular in step (C3).

In a preferred embodiment, the added substance comprises solid ferric and/or ferrous iron, and preferably the methods herein described comprise the step of dissolving said iron in said solution, more preferably before, during and/or after said iron is bound in ferric and/or ferrous chloride.

In an embodiment, the iron content of the solution is increased from an iron content of less than 10 wt %, preferably between 4 wt % and 9 wt %, to an iron content of more than 15 wt %, e.g. 16, 17, 18, 19, 20, 21, 22, 23, 24, 25, 26, 27, 28, 29, 30 wt % or any value there between. Preferably the concentration is increased to more than 20 wt %, more preferably more than 21 wt %, yet more preferably more than 22 wt %, still more preferably more than 23 wt %, even more preferably more than 24 wt %. In a preferred embodiment, the concentration is increased to less than 30 wt %, more preferably less than 29 wt %, yet more preferably less than 28 wt %, still more preferably less than 27 wt %, even more preferably less than 26 wt %, yet even more preferably less than 25 wt %. Most preferably, the concentration is increased to about 24.5 wt %.

The present invention provides a method for obtaining a solution comprising a ferric chloride at an increased concentration, preferably a concentration of at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

Preferred embodiments of these methods are described in claims 1 to 12 and further in this document.

In a preferred embodiment, the hydrochloric acid is added in step (C2) by absorption from a gaseous state by said solution.

In a preferred embodiment, said substance added in step (C3) comprises solid iron and/or solid hematite. By using solid hematite, the ferric chloride concentration can be increased to more than 75 wt %. By using solid iron or a mixture of solid iron and hematite, the ferric chloride concentration can be increased even higher than with hematite.

The previous embodiments of the method comprise the step of increasing an iron content of said solution by adding a substance comprising iron. This step seems necessary to allow an increase of the iron content of the solution without evaporation step and thus in a more energy efficient manner as in the prior art.

The ferric chloride solution with a high iron content, preferably 23 wt %, 24 wt %, 25 wt %, 26 wt % or higher, can be stored, transported or moved as a solution by maintaining a solution temperature so the ferric chloride is stable in solution. In a preferred embodiment the temperature is 8° C. or higher. In other embodiments the temperature can be 30° C. or higher and in another embodiment the temperature can be 50° C., for example about 80° C. or about 100° C. In a preferred embodiment the temperature is 100° C. or lower. In other embodiments the temperature can be 75° C. or lower for example about 8° C. or about 50° C. For frozen ferric chloride solutions, heat can be applied to facilitate the solid to liquid phase change. Once transported to the desired location, the ferric chloride solution having the high iron content can then be reconstituted on-site to the desired iron concentration as desired.

In an embodiment, the method comprises the step of ensuring that said solution, in particular said solution comprising an increased ferric chloride concentration, remains or becomes liquid, e.g. by altering or controlling climatic parameters of said solution such as temperature and/or pressure. More in particular, the method may comprise the step of keeping said solution comprising a ferric chloride concentration above the freezing temperature of said solution. Note hereby that the freezing temperature of the solution depends on the concentration and that this step may require heating of said solution, in particular for ferric chloride concentrations higher than 75 wt %.

Therefore, the present invention also concerns a method for storing, transporting and/or moving a ferric chloride solution, preferably a ferric chloride solution obtained by a method according to the present invention, with an iron content of at least 23 wt %, preferably at least 24 wt %, such as 24 wt %, 25 wt %, 26 wt % or higher and any value there between. Preferably said method comprises storing, transporting and/or moving said ferric chloride solution at a temperature of about 8° C. or more. Preferably, said solution is stored for a duration which is longer than 1 day, more preferably longer than 2 days, still more preferably longer than 3 days, such as 4, 5, 6, 7, 8, 9, 10 days or longer, and/or preferably said solution is transported or moved over distances longer than 100 km, preferably longer than 500 km, more preferably longer than 1000 km, such as 2000 km, 3000 km, 4000 km, 5000 km, 6000 km, 7000 km, 8000 km, 9000 km, 10000 km or any value there between or even longer than 10000 km. In an embodiment, said ferric chloride solution is stored, transported and/or moved in an intermodal container or by barge.

Note hereby that storage, transport or moving of ferric chloride solutions over a long period or over long distances, preferably in intermodal containers or a barge, do not seem to have been done or contemplated previously. The present invention allows to produce highly concentrated ferric chloride solutions in a fast, cheap and reliable manner, but requires the presence of iron containing substances. Due to its high concentration, it becomes possible to produce the ferric chloride solution at a site where iron containing substances are present, are produced or are collected, and store the solution over a longer time period or transport or move the solution over long distance, where it can be diluted to a required concentration, for a given use or application. In case the melting point or freezing point of the solution is high, in particular higher than ambient temperature, extra measures need to be taken to keep the product in a liquid state. Such measures could comprise e.g. isolation or tracing, to avoid the product from crystalizing or solidifying. In this respect, a solution with an increased concentration of between 67 wt % and 75 wt %, more preferably about 71 wt %, is preferred as it crystalizes only around 8° C., which simplifies transport and storage of the solution. For storage, e.g. a limited isolation and/or tracing could suffice. The melting or freezing temperature of the solution determines the type of tracing which can be used. If a product melts/freezes about 8° C., electrical tracing usually suffices. A product with metling/freezing temperature above 100° C. requires e.g. steam tracing. The type of tracing also determines at least partly the material which can be used in storage or transport vessels or pipes, as well as their lifetime. Intermodal containers can hereby be adapted for such long-time storage and/or long-distance transport. Barges can be adapted for long-distance transport. Note that, due to the corrosive nature of ferric chloride solutions, it is not evident to use barges for transporting ferric chloride solutions.

Intermodal containers, also called container, freight container, ISO container, shipping container, hi-cube container, box, conex box or sea can, preferably are a standardized reusable steel box used for the safe, efficient and secure storage and movement of materials and products within a global containerized intermodal freight transport system. "Intermodal" indicates that the container can be moved from one mode of transport to another (e.g. from ship, to rail, to truck) without unloading and reloading the contents of the container.

Barges refer to boats or ships, adapted for transporting goods and products over water ways, preferably over rivers, canals and lakes.

In view of the above, the present invention also concerns an intermodal container or barge comprising a ferric chloride solution with a concentration of at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %. The present invention also concerns the use of an intermodal container or barge for for storing, transporting and/or moving a ferric chloride solution, preferably a ferric chloride solution obtained by a method according to the present invention, and preferably said ferric chloride solution comprising a concentration of at least 15 wt %, preferably at least 18 wt %, more preferably at least 20 wt %, still more preferably at least 23 wt %, yet more preferably at least 25 wt %, even more preferably at least 27 wt %, yet more preferably at least 30 wt %, still more preferably at least 32 wt %, even more preferably at least 35 wt %, yet still more preferably at least 38 wt %, yet even more preferably at least 40 wt %, still even more preferably at least 50 wt %, still more preferably at least 60 wt %, yet more preferably at least 65 wt %, e.g. 66 wt %, 67 wt %, 68 wt %, 69 wt %, 70 wt %, 71 wt %, 72 wt %, 73 wt %, 74 wt %, 75 wt % or higher, most preferably about 71 wt %.

The agent used in the oxidation step can be chosen out of the list of chlorine gas ($Cl_2$), ozone ($O_3$), oxygen gas ($O_2$), chlorine dioxide ($ClO_2$), sodium hypochlorite (NaOCl), oxychlorination gas (which could be a combination of oxygen gas ($H_2O_2$) and hydrochloric acid (HCl)), peroxides, especially hydrogen peroxide ($H_2O_2$), perchlorate, especially sodium perchlorate ($NaClO_3$). Chlorine gas ($Cl_2$), oxygen gas ($O_2$), a mixture of oxygen gas and hydrochloric acid gas ($O_2$+HCl), or a mixture thereof is used in a preferred embodiment.

The present invention will be now described in more details, referring to examples that are not limitative.

EXAMPLES

Example 1: See FIG. 1

A ferric chloride solution (11) is provided with a concentration of 12 wt %. Hydrochloric acid in gaseous state (12) is absorbed (13) in said solution (11), resulting in a solution comprising ferric chloride and hydrochloric acid (14). Note that this may decrease the concentration of ferric chloride in the solution (14). Ferric oxide (15), e.g. in the form of hematite or ferrite, is added to the solution (14). The ferric oxide reacts at least partially with the hydrochloric acid (16) to form ferric chloride in the solution. Note that the ferric oxide can be added as a solid, but that the reaction (16) results in ferric iron which is dissolved in the solution. Note also that adding the ferric oxide increases the iron content of the solution (14), even though water is formed in the reaction (16). This is due to the heavy molecular mass of ferric chloride compared to water, theoretically allowing up to about 85.7 wt % of ferric chloride solution with this reaction.

The resulting ferric chloride solution (17) comprises a concentration, which is higher than 12 wt %, e.g. 16 wt %. The resulting solution may also comprise hydrochloric acid, e.g. which did not participate in reaction (16). In order to increase the concentration further, steps (13) and (16) could be repeated using the resulting solution (17) as input (19). This repetition of steps could be performed multiple times to increase the concentration of ferric chloride, resulting in a final solution (18) comprising at least 38 wt %, preferably 40 wt %, more preferably between 60 wt % and 80 wt %, most preferably about 71 wt % of ferric chloride.

In case hydrochloric acid is present in the resulting solution (17), step (16) can be repeated using the resulting solution (17) as input (20).

In a similar example, the initial ferric chloride concentration can be about 40 wt %:
a. f.ex. A 40 wt % ferric chloride ($FeCl_3$) solution, with an iron content of about 14 wt %, is saturated with wet hydrochloric acid gas ($HCl_{(g)}$)
b. Increasing iron content by adding magnetite ($Fe_3O_4$) yielding in a solution comprising ferric chloride ($FeCl_3$) and ferrous chloride ($FeCl_2$), with an increased iron content of about 16.5 wt %.
c. Followed with chlorination of ferrous chloride to obtain a solution with a ferric chloride concentration of 47 wt %.

| X | $Fe_3O_4$+ | 8HCl+ | $FeCl_3$→ | $FeCl_2$+ | $3FeCl_3$+ | $4H_2O$ |
|---|---|---|---|---|---|---|
| g X | 231.5 | 291.7 | 162.2 | 126.8 | 486.6 | |
| g $H_2O$ | | 424.4 | 243.3 | | | 739.7 |
| wt % X | | 41% | 40% | | | |

| X | $FeCl_2$+ | $FeCl_3$+ | $Cl_2$-> | $FeCl_3$ |
|---|---|---|---|---|
| g X | 126.8 | 486.6 | 35.5 | 648.8 |
| g H2O | | 739.7 | | 739.7 |
| wt % X | | | | 47% |

With these steps, the increased ferric chloride concentration is higher than said initial ferric chloride concentration by 7 wt %.

Figure 2:
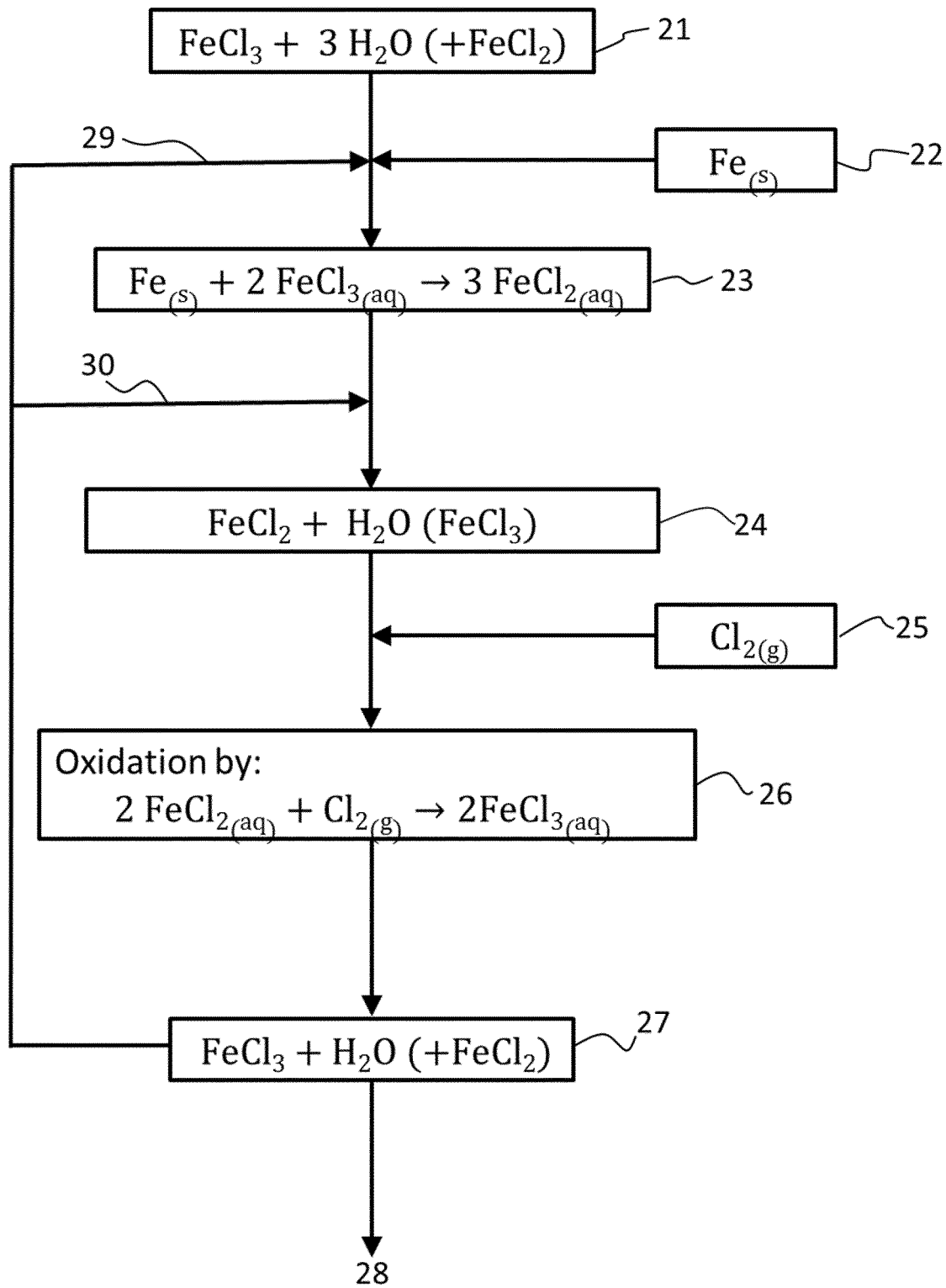

Example 2: See FIG. 2

A ferric chloride solution (21) is provided with a concentration of about 12 wt %. The solution may also comprise ferrous chloride. Solid iron (22) is added to the solution (21). The solid iron (22) reacts with ferric chloride in the solution (21), to form ferrous chloride according to reaction (23). Note that this results in an increase of the iron content of the solution, and that a solution (24) is obtained comprising ferrous chloride and possibly ferric chloride which did not react in reaction (24). Chlorine gas (25) is added to the solution (24), resulting in the oxidation of the ferrous iron according to an oxychlorination reaction (26).

The resulting ferric chloride solution (27) comprises a concentration, which is higher than 12 wt %, e.g. 38 wt %. The resulting solution may also comprise ferrous chloride, e.g. which did not participate in reaction (26).

In order to increase the concentration further, steps (23) and (26) could be repeated using the resulting solution (27) as input (29). This repetition of steps could be performed multiple times to increase the concentration of ferric chloride, resulting in a final solution (28) comprising at least 40 wt %, preferably between 60 wt % and 80 wt %, most preferably about 71 wt % of ferric chloride.

In case ferrous chloride is present in the resulting solution (27), step (26) can be repeated using the resulting solution (27) as input (30).

Figure 3:
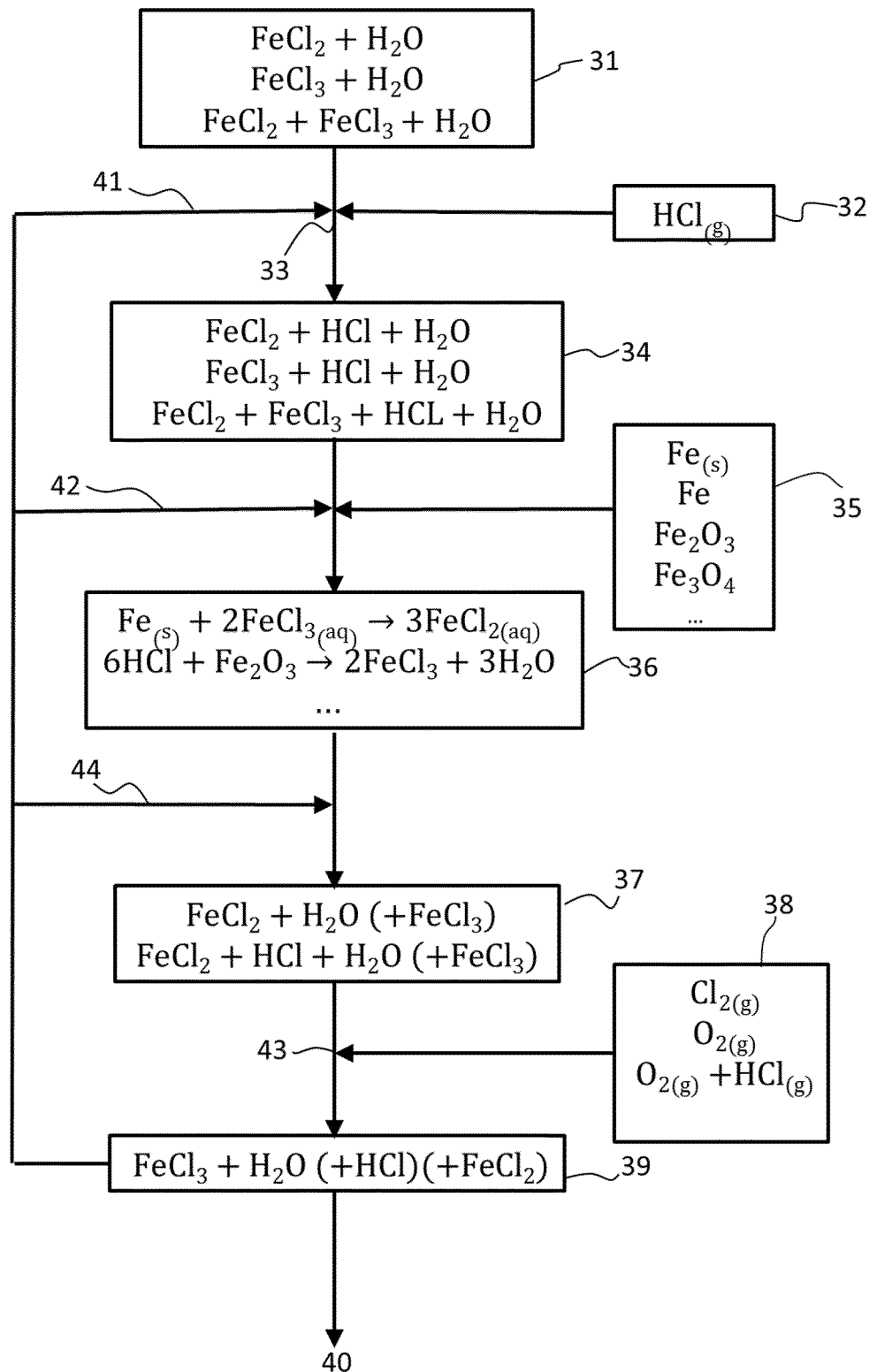

Example 3: See FIG. 3

A solution comprising ferrous and/or ferric chloride (31) is provided, comprising an iron content of about 6 wt %, e.g. waste pickling liquor from a steel pickling plant. Hydrochloric acid in gaseous state (32) is absorbed (33) in said solution (31). Note that this may decrease the iron content in the solution (34). Iron-comprising substances (35) are added to the solution (34). A number of reactions (36) may take place, resulting in an increase of the iron content. A solution (37) comprising ferrous chloride is obtained. This solution (37) may further comprise ferric chloride already formed in reactions (36) and/or hydrochloric acid which did not participate in reactions (36). An oxidizing agent (38) is added to the solution (37), resulting in the oxidation (43) of the ferrous iron in the ferrous chloride. The oxidizing agent (38) may be chlorine gas and/or oxygen gas, and the ferrous iron can be at least partially oxychlorinated. In case the amount of hydrochloric acid in the solution (37) is deemed too low to allow oxychlorination with oxygen gas, extra hydrochloric acid gas can be added in this step.

The resulting ferric chloride solution (39) may comprise an iron content which is higher than about 10 wt % concentration, and a ferric chloride concentration which is higher than 16 wt %, e.g. 38 wt %. The resulting solution (39) may also comprise ferrous chloride and/or hydrochloric acid, e.g. which did not participate in reactions (36).

In order to increase the concentration further, steps (33), (36) and (43) could be repeated using the resulting solution (39) as input (41). This repetition of steps could be performed multiple times to increase the concentration of ferric chloride, resulting in a final solution (40) comprising at least 38 wt %, preferably 40 wt %, more preferably between 60 wt % and 80 wt %, most preferably about 71 wt % of ferric chloride.

In case hydrochloric acid and/or ferrous chloride is present in the resulting solution (39), steps (36) and (43) can be repeated using the resulting solution (39) as input (42). Note that if ferrous chloride is present in the resulting solution (39), step (43) can be repeated using the resulting solution (39) as input (44) in order to increase the ferric chloride concentration.

Example 4

Reaction between iron (Fe), ferric chloride ($FeCl_3$) and chlorine gas ($Cl_2$) to obtain a 69 wt % ferric chloride ($FeCl_3$) solution starting from a 40 wt % ferric chloride $FeCl_3$ solution. See also example 2 and FIG. 2.

In this example iron is added to a ferric chloride solution yielding to a solution comprising ferrous chloride. The ferrous chloride is oxidised into ferric chloride by reacting with chlorine gas. By repeating this process 3 times the ferric chloride content of the solution is raised from 40 wt %, over 50 wt % and 60 wt % to 69 wt %. With these steps, the increased ferric chloride concentration is higher than said initial ferric chloride concentration by 10 wt %, 20 wt % to even 29 wt %.

Multistage Increasing Iron Content by Adding Fe in FeCl3 Solution Followed by Oxidizing Ferrous into Ferric Chloride

| X | Fe+ | $2FeCl_3 \rightarrow$ | $3FeCl_2$ | $FeCl_2+$ | $½Cl_2 \rightarrow$ | $FeCl_3$ |
|---|---|---|---|---|---|---|
| g X | 55.8 | 324.4 | 380.3 | 380.3 | 106.4 | 486.6 |
| g H$_2$O | | 486.6 | 486.6 | 486.6 | | 486.6 |
| wt % X | | 40% | 44% | 44% | | 50% |

| X | Fe+ | $2FeCl_3 \rightarrow$ | $3FeCl_2$ | $FeCl_2+$ | $½Cl_2 \rightarrow$ | $FeCl_3$ |
|---|---|---|---|---|---|---|
| g X | 83.8 | 486.6 | 570.4 | 570.4 | 159.5 | 729.9 |
| g H$_2$O | | 486.6 | 486.6 | 486.6 | | 486.6 |
| wt % X | | 50% | 54% | 54% | | 60% |

| X | Fe+ | $2FeCl_3 \rightarrow$ | $3FeCl_2$ | $FeCl_2+$ | $½Cl_2 \rightarrow$ | $FeCl_3$ |
|---|---|---|---|---|---|---|
| g X | 125.7 | 729.9 | 855.6 | 855.6 | 239.3 | 1094.9 |
| g H$_2$O | | 486.6 | 486.6 | 486.6 | | 486.6 |
| wt % X | | 60% | 64% | 64% | | 69% |

Note that in this example 4, step (C2) is not performed, while step (C4) is performed as a large amount of ferrous ion is present in the ferrous chloride solution obtained after adding the iron (Fe) to the solution.

Note: once the reactor is filled with FeCl3 69% this reaction can take place in 1 step in the reactor by simultaneously adding Fe, FeCl$_3$ 40% and Cl$_2$. i.e. after performing the steps (C3) and (C4) three times subsequently, they can now be performed simultaneously to increase the ferric chloride concentration of a solution of 40 wt % ferric chloride to 69 wt %, i.e. an increase of 29 wt %, in a single process combining steps (C3) and (C4) in a simultaneous manner. In an alternative view, one could also note that the amount of solution with a ferric chloride concentration of 69 wt % is increased. This is illustrated in the table below.

| X | Fe+ | $2FeCl_3+$ | $½Cl_2+$ | $FeCl_3->$ | $FeCl3$ |
|---|---|---|---|---|---|
| g X | 55.8 | 324.4 | 106.4 | 69.4 | 556.0 |
| g H$_2$O | | 145.7 | | 104.0 | 249.8 |
| wt % X | | 69% | | 40% | 69% |

Example 5

Reaction between Iron (Fe), Hydrochloric Acid (HCl$_{(g)}$) and Chlorine Gas (Cl$_2$) to Obtain a 57 wt % Ferric Chloride (FeCl$_3$) Solution starting from a 19 wt % Ferric Chloride (FeCl$_3$) Solution.
 a. A 19 wt % ferric chloride (FeCl$_3$) solution is saturated with hydrochloric acid (HCl$_{(g)}$)
 b. Increasing iron content by adding iron (Fe) yielding in a solution comprising ferrous chloride (FeCl$_2$) at a concentration of 51 wt %.

| X | 2Fe+ | 2HCl+ | $2FeCl_3 \rightarrow$ | $4FeCl2+$ | H2$_{(g)}$ |
|---|---|---|---|---|---|
| g X | 62.8 | 72.9 | 40.2 | 173.9 | 2.0 |
| g H$_2$O | | | 166.9 | 166.9 | |
| wt % X | | | 19% | 51% | | c. Oxidizing ferrous chloride (FeCl$_2$) into ferric chloride (FeCl$_3$) using chlorine gas (Cl$_2$).

| X | $FeCl_2+$ | $½Cl_2 \rightarrow$ | $FeCl_3$ |
|---|---|---|---|
| g X | 173.9 | 48.6 | 222.5 |
| g H$_2$O | 166.9 | | 166.9 |
| wt % X | 51% | | 57% |

Hereby, performing steps (C2), (C3) and (C4) result in an increase of the ferric chloride concentration by 38 wt %.

Example 6

Reaction between Magnetite (Fe$_3$O$_4$), Iron (Fe), Hydrochloric Acid (HCl$_{(g)}$) and Chlorine Gas (Cl$_2$) to obtain a 55 wt % Ferric Chloride (FeCl$_3$) Solution starting from a 40 wt % Ferric Chloride (FeCl$_3$) Solution.
 a. A 40 wt % ferric chloride (FeCl$_3$) solution is saturated with hydrochloric acid (HCl$_{(g)}$)
 b. Increasing iron content by adding magnetite (Fe$_3$O$_4$) yielding in a solution comprising ferric chloride and ferrous chloride (FeCl$_2$) with an increased iron content.

| X | $Fe_3O_4+$ | 8HCl+ | $FeCl_3 \rightarrow$ | $FeCl_2+$ | $2FeCl_3+$ | $4H_2O$ |
|---|---|---|---|---|---|---|
| g X | 231.5 | 291.7 | 162.2 | 126.8 | 486.6 | |
| g H$_2$O | | 424.3 | 241.4 | | | 739.7 |
| wt % X | | 41% | 40% | | | | c. Further increasing of iron content by adding iron (Fe) yielding in a solution comprising ferrous chloride (FeCl$_2$)

| X | Fe+ | $2FeCl_3+$ | $FeCl_2 \rightarrow$ | $3FeCl_2$ |
|---|---|---|---|---|
| g X | 83.8 | 486.6 | 126.8 | 697.2 |
| g H$_2$O | | | 739.7 | 739.7 |
| wt % X | | | | 49% | d. Oxidizing ferrous chloride into ferric chloride using chlorine gas (Cl$_2$)

| X | $FeCl_2+$ | $½Cl_2 \rightarrow$ | $FeCl_3$ |
|---|---|---|---|
| g X | 697.2 | 195.0 | 892.2 |
| g H$_2$O | 739.7 | | 739.7 |
| wt % X | 49% | | 55% |

Hereby, an increase of 15 wt % of the ferric chloride concentration is achieved by performing steps (C2), (C3) and (C4).

Example 7

Reaction between Hematite (Fe$_2$O$_3$) and Hydrochloric Acid (HCl$_{(g)}$) to obtain a 71 wt % Ferric Chloride (FeCl$_3$) Solution starting from a 40 wt % Ferric Chloride (FeCl$_3$)

solution by simultaneously adding Hematite ($Fe_2O_3$) and Hydrochloric acid ($HCl_{(g)}$) in a reactor

| X | $Fe_2O_3+$ | 6HCl+ | $FeCl_3->$ | $2FeCl_3+$ | $3H_2O$ |
|---|---|---|---|---|---|
| g X | 159.7 | 218.8 | 73.0 | 324.4 | 54.0 |
| g $H_2O$ | | | 109.5 | 73.0 | 109.5 |
| wt % X | | | 40% | 71% | |

Hereby, an increase of 31 wt % of the ferric chloride concentration is achieved by performing steps (C2) and (C3) simultaneously.

Example 8

Producing a ferric chloride ($FeCl_3$) concentrate higher than 71 wt % $FeCl_3$ starting from 40 wt % ferric chloride ($FeCl_3$) solution.

A 76.1 wt % $FeCl_3$ solution has been prepared, starting from a 40 wt % ferric chloride solution, by 4 times repeating the following procedure: saturating the ferric chloride ($FeCl_3$) solution with hydrochloric acid ($HCl_{(g)}$), addition of magnetite ($Fe_3O_4$) and oxidation with chlorine gas ($Cl_2$). The concentration $FeCl_3$ raised from 40 wt % over 53.6 wt %, 62.3 wt %, 68.8 wt % to 76.1 wt % $FeCl_3$.

Analysis starting solution: 0.55 g/l Fe(II), 199.4 g/l Fe(III), 11.4 g/l HCl and d=1.434 g/ml=40.3 wt % $FeCl_3$ Step 1
1) $HCl_{(g)}$-addition to a 40 wt % $FeCl_3$-solution until saturation
2) $Fe_3O_4$-addition to the saturated $HCl/FeCl_3$-solution
3) $Cl_2$-addition to the $FeCl_2/FeCl_3$-solution.
   Yielding to <0.5 g/l Fe(II), 302.4 g/l Fe(III), 17.5 g/l HCl and d=1.638 g/ml=53.6 wt % $FeCl_3$ Step 2
4) $HCl_{(g)}$-addition to a 53.6 wt % $FeCl_3$-solution until saturation
5) $Fe_3O_4$-addition to the saturated $HCl/FeCl_3$-solution
6) $Cl_2$-addition to the $FeCl_2/FeCl_3$-solution.
   Yielding to 1.0 g/l Fe(II), 364.2 g/l Fe(III), 13.4 g/l HCl and d=1.696 g/ml=_62.3 wt % $FeCl_3$.

Step 3
7) $HCl_{(g)}$-addition to a 62.3 wt % $FeCl_3$-solution until saturation
8) $Fe_3O_4$-addition to the saturated $HCl/FeCl_3$-solution
9) $Cl_2$-addition to the $FeCl_2/FeCl_3$-solution.
   Yielding to <0.5 g/l Fe(II), 410.5 g/l Fe(III), 20.4 g/l HCl and d=1.734 g/ml=68.8 wt % $FeCl_3$.

Step 4
10) $HCl_{(g)})$ addition to a 68.8 wt % $FeCl_3$-solution until saturation
11) $Fe_3O_4$-addition to the saturated $HCl/FeCl_3$-solution
12) $Cl_2$-addition to 0.95 liter of the $FeCl_2/FeCl_3$-solution at 85° C. during 2 hours.
    Yielding to <0.5 g/l Fe(II), 476.4 g/l Fe(III), 8.1 g/l HCl and d=1.818 g/ml=_76.1 wt % $FeCl_3$.

It is supposed that the present invention is not restricted to any form of realization described previously and that some modifications can be added to the presented examples without reappraisal of the appended claims.

The invention claimed is:

1. A method for obtaining a solution comprising an increased ferric chloride concentration of between about 67 wt. % and about 75 wt. %, comprising the steps of:
   (a) providing a solution comprising ferric chloride and/or ferrous chloride, and having an initial ferric chloride concentration;
   (b) increasing an iron content of said solution from the iron content of less than about 10 wt. % to the iron content of more than about 23 wt. % by adding a substance comprising iron, ferric iron and/or ferrous iron,
   wherein the step after adding a substance comprising iron, ferric iron and/or ferrous ion further comprises at least one of the following steps:
      (1) adding hydrochloric acid to the solution, and/or
      (2) oxidizing ferrous ion in the solution; and
   (c) obtaining the solution comprising an increased ferric chloride concentration of between about 67 wt. % and about 75 wt. %.

2. The method according to claim 1, wherein the method is carried out without an evaporation step.

3. The method according to claim 1, further comprising the step of maintaining a temperature of about 8° C. or higher of the solution comprising an increased ferric chloride concentration of between about 67 wt. % and about 75 wt. %.

4. The method according to claim 1, wherein said solution obtained in step (b) comprises ferrous ion and said ferrous ion in said solution is oxidized in step (b)(2).

5. The method according to claim 1, wherein said increased ferric chloride concentration is higher than said initial ferric chloride concentration by at least about 1 wt. %.

6. The method according to claim 1, wherein the provided solution in step (a) comprises a ferric chloride concentration of at least about 12 wt. %.

7. The method according to claim 1, wherein said iron-comprising substance comprises iron, hematite, magnetite, iron oxide, ferrite, or any combination thereof.

8. The method according to claim 1, wherein step (b) comprises oxidation using ozone, oxygen gas, chlorine dioxide, sodium hypochlorite, peroxide, hydrogen peroxide, perchlorate, or sodium perchlorate, chlorination and/or oxychlorination.

9. The method according to claim 1, wherein the steps of adding the substance comprising iron, ferric iron and/or ferrous iron, increasing the iron content of said solution, adding hydrochloric acid to the solution, and oxidizing the ferrous ion in the solution are performed multiple times subsequently or simultaneously.

10. The method according to claim 1, wherein step (b)(1) is performed before, during and/or after adding the substance comprising iron, ferric iron and/or ferrous iron, and/or wherein step (b)(1) is performed before and/or during step (b)(2).

11. The method according to claim 1, wherein in step (b)(1) hydrochloric acid in a gaseous state is added to and absorbed by said solution in step (b).

12. The method according to claim 1, for increasing an iron content of a solution, wherein step (a) comprises providing a solution having an initial iron content of at least about 4 wt. %; and wherein step (b) comprises adding a substance comprising iron, to obtain a solution having an increased iron content of at least about 12 wt. % compared to the solution provided in step (a).

13. The method according to claim 1, further comprising diluting the solution obtained by the method of claim 1 to decrease its concentration of ferric chloride.

14. A method for storing, transporting and/or moving a ferric chloride solution with an iron content of at least about 23 wt. % or higher comprising placing the solution obtained by the method of claim 1 in an intermodal container or barge.

15. The method according to claim 1, whereby said solution is stored, transported and/or moved in an intermodal container or in a barge.

16. A method for storing, transporting and/or moving a ferric chloride solution with an iron content of between about 67 wt. % and about 75 wt. %, comprising placing the solution obtained by the method according to claim 1 in an intermodal container or barge adapted for long-time storage, long-distance transport without tracing, and/or long-distance transport with tracing.

17. The method according to claim 1, wherein step (b)(2) comprises oxidizing ferrous ion with an agent selected from chlorine gas, ozone, oxygen gas, chlorine dioxide, sodium hypochlorite, oxychlorination gas, peroxides, perchlorate or a combination of one or more thereof.

18. The method according to claim 17, wherein the oxychlorination gas comprises a combination of oxygen gas and hydrochloric acid gas.

19. The method according to claim 1, further comprising maintaining the solution comprising an increased ferric chloride content above its freezing point.

* * * * *

UNITED STATES PATENT AND TRADEMARK OFFICE
CERTIFICATE OF CORRECTION

PATENT NO.         : 10,550,006 B2
APPLICATION NO.    : 14/893047
DATED              : February 4, 2020
INVENTOR(S)        : Rudy Peeters Page 1 of 1

It is certified that error appears in the above-identified patent and that said Letters Patent is hereby corrected as shown below:

In the Claims

Column 19, Line 4, the text "claim 1" should be changed to -- claim 14 --.

Signed and Sealed this
Twelfth Day of May, 2020

Andrei Iancu
*Director of the United States Patent and Trademark Office*